(12) United States Patent
Shin et al.

(10) Patent No.: US 10,810,118 B2
(45) Date of Patent: Oct. 20, 2020

(54) DATA STORAGE DEVICE AND OPERATING METHOD THEREOF

(71) Applicant: SK hynix Inc., Gyeonggi-do (KR)

(72) Inventors: Soong Sun Shin, Gyeonggi-do (KR); Duck Hoi Koo, Gyeonggi-do (KR); Yong Tae Kim, Seoul (KR); Cheon Ok Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 146 days.

(21) Appl. No.: 16/001,330

(22) Filed: Jun. 6, 2018

(65) Prior Publication Data

US 2019/0065362 A1   Feb. 28, 2019

(30) Foreign Application Priority Data

Aug. 28, 2017   (KR) .................. 10-2017-0108565

(51) Int. Cl.
*G06F 3/00* (2006.01)
*G06F 12/02* (2006.01)
*G06F 3/06* (2006.01)

(52) U.S. Cl.
CPC .......... *G06F 12/0246* (2013.01); *G06F 3/061* (2013.01); *G06F 3/0631* (2013.01); *G06F 3/0656* (2013.01); *G06F 3/0658* (2013.01); *G06F 3/0659* (2013.01); *G06F 3/0679* (2013.01)

(58) Field of Classification Search
None
See application file for complete search history.

(56) References Cited

U.S. PATENT DOCUMENTS

2010/0268891 A1   10/2010   Conte et al.

FOREIGN PATENT DOCUMENTS

KR          100725100          6/2007

*Primary Examiner* — Midys Rojas
(74) *Attorney, Agent, or Firm* — IP & T Group LLP

(57) ABSTRACT

A data storage device includes a nonvolatile memory device and a controller configured to control an operation of the nonvolatile memory device. The controller includes a volatile memory including a first index storage unit in which first index information for first data buffers are stored and a second index storage unit in which second index information for second data buffers are stored, a first central processing unit (CPU) configured to perform allocation and release of allocation of the first data buffers by accessing the first index storage unit of the volatile memory, and a second CPU configured to perform allocation and release of allocation of the second data buffers by accessing the second index storage unit of the volatile memory.

20 Claims, 10 Drawing Sheets

DATA STORAGE DEVICE AND OPERATING METHOD THEREOF

CROSS-REFERENCES TO RELATED APPLICATION

The present application claims priority under 35 U.S.C. § 119(a) to Korean patent application number 10-2017-0108565, filed on Aug. 28, 2017, which is incorporated herein by reference in its entirety.

BACKGROUND

1. Technical Field

Various embodiments of the present disclosure generally relate to a semiconductor device. Particularly, exemplary embodiments of the present disclosure relate to a data storage device and operating method thereof.

2. Related Art

In recent years, the paradigm for computer environments has changed to ubiquitous computing environment which allows users to get an access to a computer system anywhere anytime. For this reason, the use of portable electronic devices, such as cellular phones, digital cameras, laptop computers, and the like is surging. The portable electronic devices may include a data storage device using a memory device. The data storage device may be used for storing data used in a portable electronic device.

The data storage device using the memory device may have excellent stability and durability because it does not include a mechanical driving element. Also, the data storage device is advantageous in that it may access data quickly and consume a small amount of power. Examples of a data storage device may include, but not limited to, a universal serial bus (USB) memory device, a memory card having various interfaces, a universal flash storage (UFS) device, a solid state drive (SSD), etc.

SUMMARY

Embodiments are provided to a data storage device with improved operation speed and operating method thereof.

In an embodiment of the present disclosure, a data storage device includes: a nonvolatile memory device; and a controller configured to control an operation of the nonvolatile memory device. The controller includes a volatile memory including a first index storage unit in which first index information for first data buffers are stored and a second index storage unit in which second index information for second data buffers are stored; a first central processing unit (CPU) configured to perform allocation and release of allocation of the first data buffers by accessing the first index storage unit of the volatile memory; and a second CPU configured to perform allocation and release of allocation of the second data buffers by accessing the second index storage unit of the volatile memory.

In an embodiment of the present disclosure, an operating method of a data storage device including a nonvolatile memory device and a controller, the controller including a volatile memory including a first index storage unit and a second index storage unit, a first central processing unit (CPU) and a second CPU includes: receiving, by the first CPU, a write request and write data from a host device; allocating, by the first CPU, at least one first data buffer among first data buffers by accessing the first index storage unit of the volatile memory; storing, by the first CPU, the write data in the allocated first data buffer; and providing, by the first CPU, the first index information corresponding to the allocated first data buffer to the second CPU.

These and other features, aspects, and embodiments are described below in the section entitled "DETAILED DESCRIPTION".

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Figure 1:
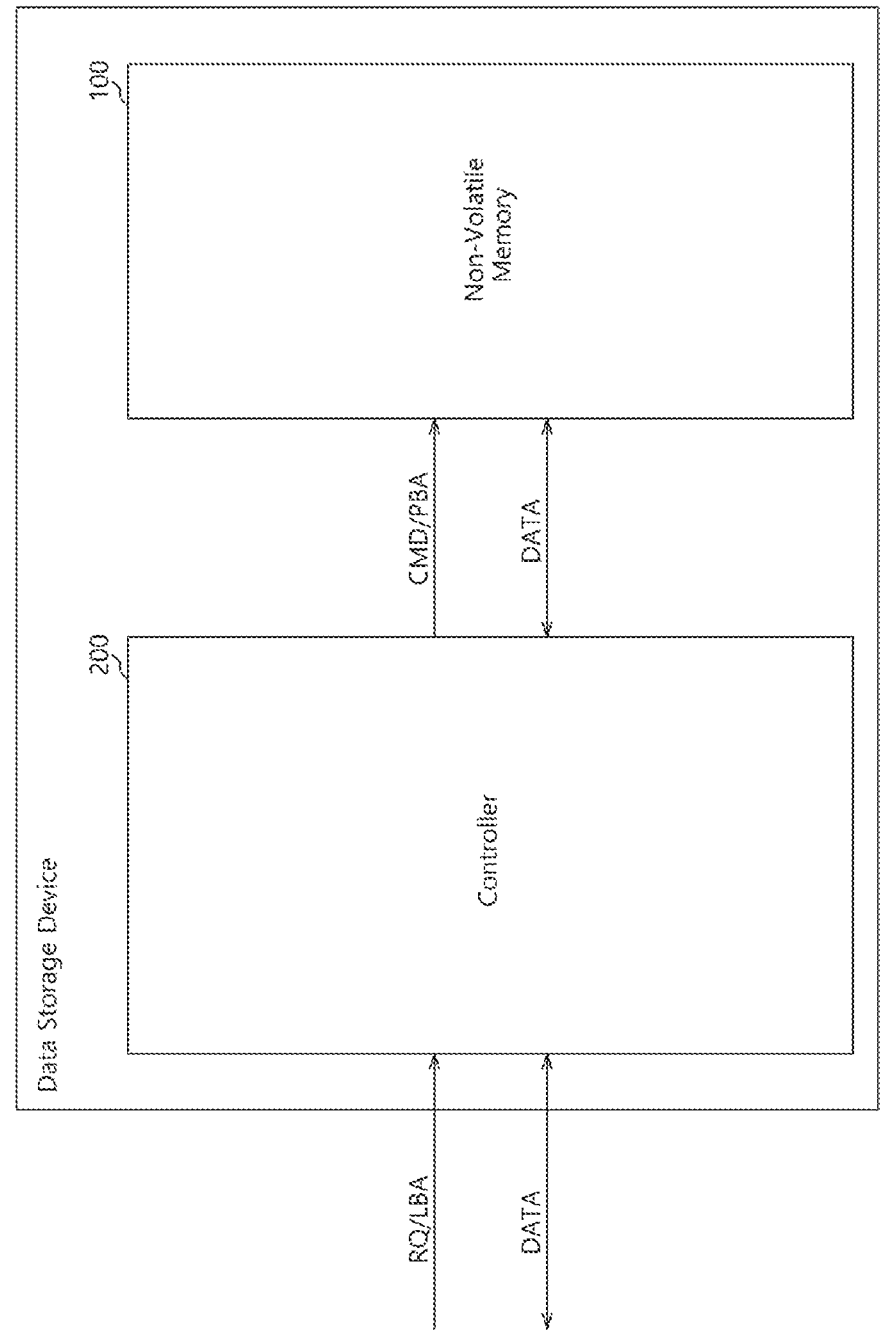
FIG. 1 is a block diagram illustrating a data storage device according to an embodiment of the present disclosure.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The phrase "at least one of . . . and . . . ," when used herein with a list of items, means a single item from the list or any combination of items in the list. For example, "at least one of A, B, and C" means, only A, or only B, or only C, or any combination of A, B, and C.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It is also noted, that in some instances, as would be apparent to those skilled in the relevant art, an element also referred to as a feature described in connection with one embodiment may be used singly or in combination with other elements of another embodiment, unless specifically indicated otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

The present invention is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

Hereinafter, the various embodiments of the present invention will be described in detail with reference to the attached drawings.

Figure 2:
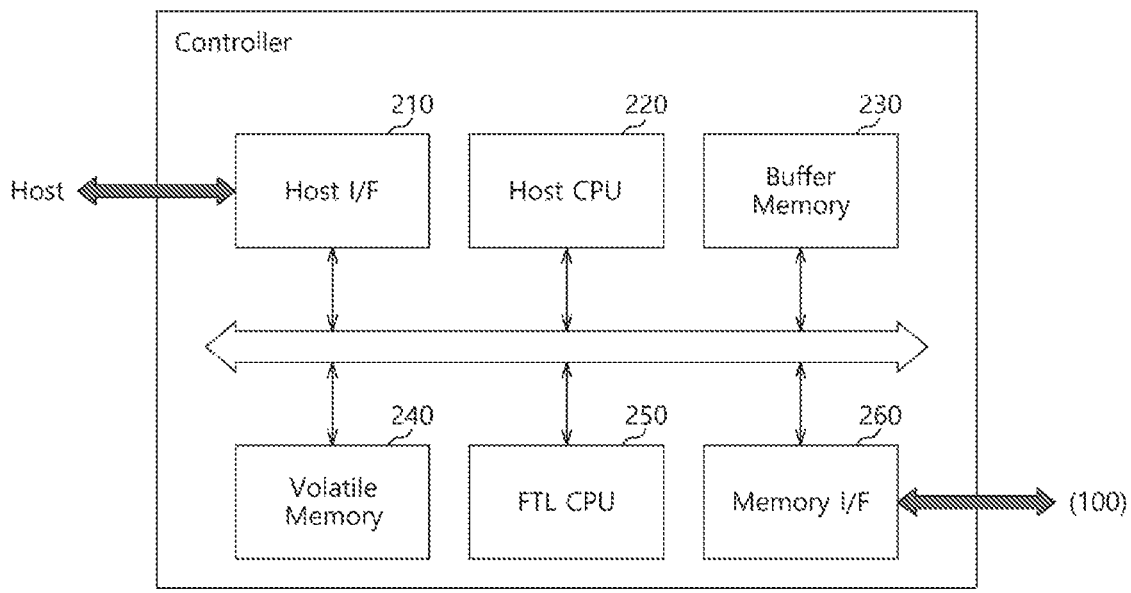
FIG. 2 is a block diagram illustrating an exemplary configuration of a controller of FIG. 1.
Figure 3:
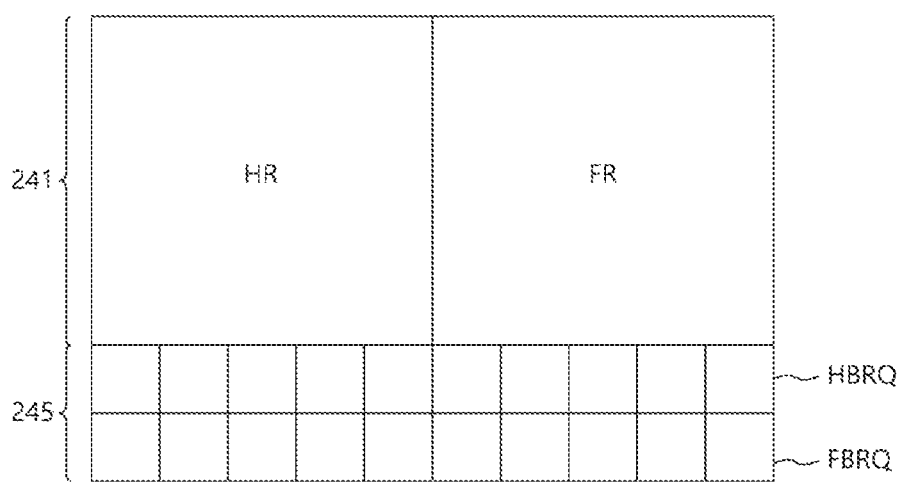
FIG. 3 is a diagram illustrating an exemplary configuration of a volatile memory of FIG. 2.
Figure 4:
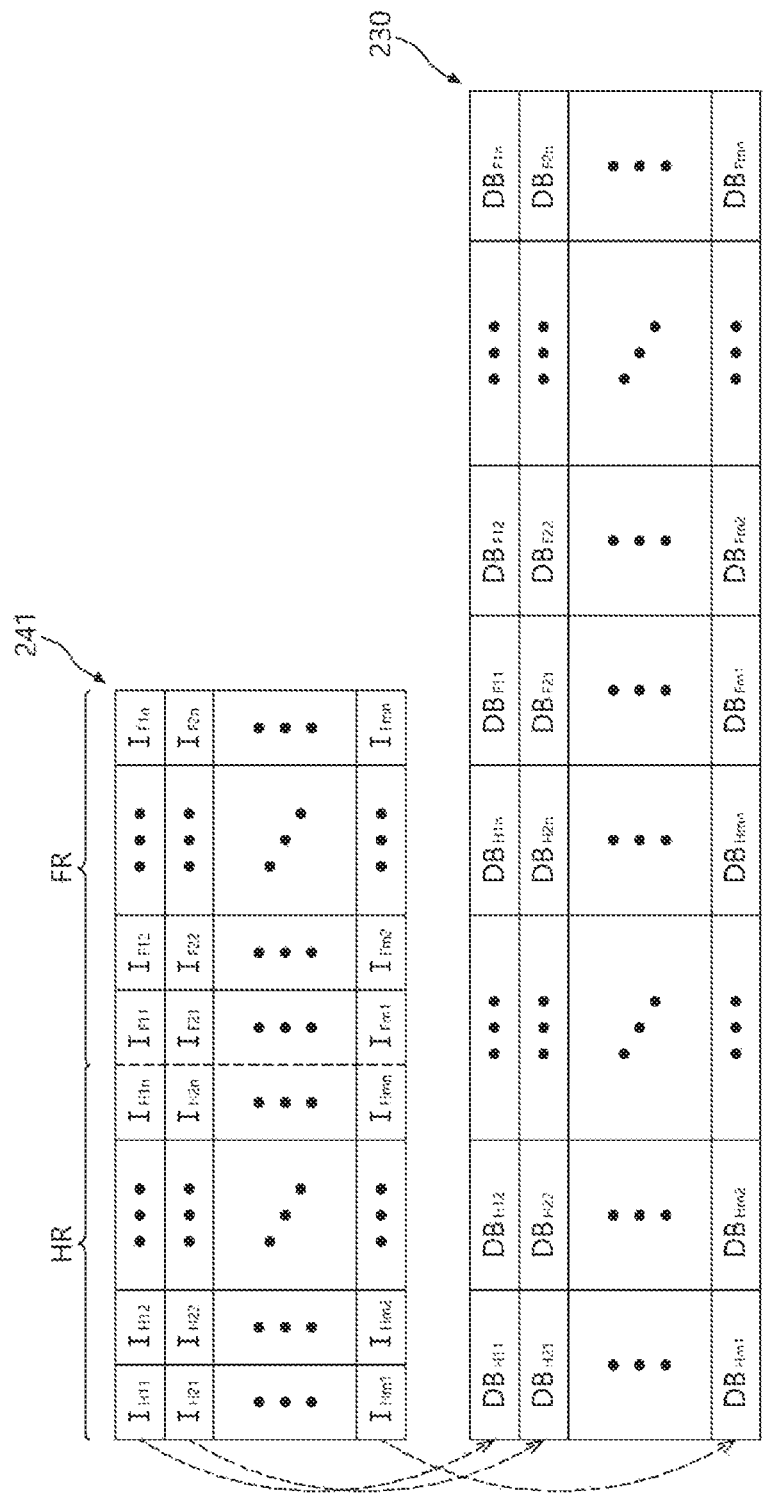
FIG. 4 is a diagram illustrating a relationship between index information stored in a volatile memory and data buffers of a buffer memory according to an embodiment of the present disclosure.

FIG. 1 is a block diagram illustrating a data storage device according to an embodiment, FIG. 2 is a block diagram illustrating an exemplary configuration of a controller 200 of FIG. 1, FIG. 3 is a diagram illustrating an exemplary configuration of a volatile memory of FIG. 2, and FIG. 4 is a diagram illustrating a relationship between index information stored in a volatile memory and data buffers of a buffer memory according to an embodiment.

Referring to FIG. 1, the data storage device 10 according to an embodiment may perform a memory operation, which writes or reads data in response to an access request of a host device (not shown) such as a mobile phone, an MP3 player, a laptop computer, a desktop computer, a game player, a television (TV), an in-vehicle infotainment system, and the like. The data storage device 10 may refer to a memory system.

The data storage device 10 may be manufactured as any one among various types of storage devices according to a protocol of an interface coupled to a host device. For example, the data storage device 10 may be configured of any one of various types of storage devices such as a solid state drive (SSD), a multimedia card in the form of an MMC, an eMMC, an RS-MMC, and a micro-MMC, a secure digital card in the form of an SD, a mini-SD, and a micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-e) card type storage device, a compact flash (CF) card, a smart media card, a memory stick, and the like.

The data storage device 10 may be manufactured as any one among various types of packages. For example, the data storage device 10 may be manufactured as any one of various types of packages such as a package on package (POP), a system in package (SIP), a system on chip (SOC), a multi-chip package (MCP), a chip on board (COB), a wafer-level fabricated package (WFP), a wafer-level stack package (WSP), and the like.

The data storage device 10 may include a nonvolatile memory device 100 and the controller 200.

The nonvolatile memory device 100 may be operated as a storage medium of the data storage device 10. The nonvolatile memory device 100 may include any one of various types of nonvolatile memory devices, such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, and a resistive random access memory (RRAM or ReRAM) using a transition metal compound.

It has been illustrated in FIG. 1 that the data storage device 10 includes one nonvolatile memory device 100 for clarity, but the data storage device 10 may include a plurality of nonvolatile memory devices. The data storage device 10 including one nonvolatile memory device in the embodiment may be equally applied to the data storage device 10 including the plurality of nonvolatile memory devices.

The nonvolatile memory device 100 may include a memory cell array (not shown) including a plurality of memory cells arranged in regions in which a plurality of bit lines (not shown) and a plurality of word lines (not shown) cross each other. Each of the memory cells in the memory cell array may be at least one among a single level cell (SLC) in which a single bit data (for example, 1-bit data) is stored, a multilevel cell (MLC) in which 2-bit data is stored, a triple level cell (TLC) in which 3-bit data is stored, and a quad level cell QLC in which 4-bit data is stored. The memory cell array may include at least one among the SLC, the MLC, the TLC, and the QLC. For example, the memory cell array may include memory cells having a two-dimensional (2D) horizontal structure or memory cells having a 3D vertical structure.

The controller 200 may control an overall operation of the data storage device 10 through driving of firmware or software. The controller 200 may decode and drive a code-type instruction or algorithm such as the firmware or software. The controller 200 may be implemented in hardware or a combination of hardware and software.

Referring to FIG. 2, the controller 200 may include a host interface (I/F) 210, a host central processing unit (CPU) 220, a buffer memory 230, a volatile memory 240, a flash translation layer (FTL) CPU 250, and a memory interface (I/F) 260.

The host interface 210 may perform interfacing between a host device (not shown) and the data storage device 10 in response to a protocol of the host device. For example, the host interface unit 210 may communicate with the host device through any one among, for instance, a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and a PCI-e protocol.

The host CPU 220 may process overall operations related to interfacing with a host device (not shown). For example, the host CPU 220 may provide requests RQ such as a write request and a read request and a logical block address (LBA), which are received from the host device through the host interface 210, to the FTL CPU 250.

The host CPU 220 may allocate a data buffer of the buffer memory 230 and temporarily store data DATA received from the host device in the allocated data buffer. When the data DATA received from the host device is stored in the nonvolatile memory device 100, the host CPU 220 may release the allocation of the data buffer. The host CPU 220 may transfer the read data, which is temporarily stored in the data buffer corresponding to index information provided from the FTL CPU 250, to the host device.

The buffer memory 230 may temporarily store write data to be transferred to the nonvolatile memory device 100 from the host device or read data to be read from the nonvolatile memory device 100 to the host device. The buffer memory 230 may include, but not limited to, a cache memory, a read only memory (ROM), a programmable ROM (PROM), an erasable and programmable ROM (EPROM), an electrically erasable programmable ROM (EEPROM), a phase-change random access memory (PRAM), a flash memory, a static random access memory (SRAM), a dynamic random access memory (DRAM), or the like. The buffer memory 230 may include a plurality of data buffers $DB_{H11}$ to $DB_{Hmn}$ and $DB_{F11}$ to $DB_{Fmn}$ as illustrated in FIG. 4.

The volatile memory 240 may be configured of a random access memory (RAM) such as a DRAM or a SRAM. The volatile memory 240 may be accessed through the host CPU 220 and/or the FTL CPU 250.

Referring to FIG. 3, the volatile memory 240 may include an index storage unit 241 in which index information for the data buffers of the buffer memory 230 are stored, and a buffer release queue 245 in which an operation done signal ODS transferred from the host CPU 220 and the FTL 250 is queued. It has been illustrated in FIG. 3 that only the index storage unit 241 and the buffer release queue 245 are included in the volatile memory 240, but this is not limited thereto.

The volatile memory 240 may be divided into a dedicated access region of the host CPU 220 and a dedicated access region of the FTL CPU 250. For example, the index storage unit 241 of the volatile memory 240 may include a first index storage unit HR that may be accessed through the host CPU 220 and a second index storage unit FR that may be accessed through the FTL CPU 250. The host CPU 220 may access only the first index storage unit HR of the volatile memory 240 and the FTL CPU 250 may access only the second index storage unit FR of the volatile memory 240. The first index storage unit HR and the second index storage unit FR may be logically divided, but the first index storage unit HR and the second index storage unit FR may not be physically divided.

As illustrated in FIG. 4, index information $I_{H11}$ to $I_{Hmn}$ indicating the data buffers of the buffer memory 230 corresponding to the first index storage unit HR may be stored in the first index storage unit HR, and index information $I_{F11}$ to $I_{Fmn}$ indicating the data buffers of the buffer memory 230 corresponding to the second index storage unit FR may be stored in the second index storage unit FR. For example, index information $I_{H11}$ among the index information $I_{H11}$ to $I_{Hmn}$ stored in the first index storage unit HR may be index information indicating the data buffer $DB_{H11}$ among the plurality of data buffers $DB_{H11}$ to $DB_{Hmn}$ and $DB_{F11}$ to $DB_{Fmn}$ included in the buffer memory 230.

The plurality of data buffers $DB_{H11}$ to $DB_{Hmn}$ and $DB_{F11}$ to $DB_{Fmn}$ included in the buffer memory 230 may be configured to be divided into write data buffers $DB_{H11}$ to $DB_{Hmn}$ and read data buffers $DB_{F11}$ to $DB_{Fmn}$. In the write data buffers $DB_{H11}$ to $DB_{Hmn}$, write data to be transferred from a host device to the nonvolatile memory device 100 are temporarily stored, although the present embodiment is not limited thereto. In the read data buffers $DB_{F11}$ to $DB_{Fmn}$, read data to be transferred from the nonvolatile memory device 100 to the host device are temporarily stored, although the present embodiment is not limited thereto. The write data buffers $DB_{H11}$ to $DB_{Hmn}$ and the read data buffers $DB_{F11}$ to $DB_{Fmn}$ may also be logically divided, but the write data buffers $DB_{H11}$ to $DB_{Hmn}$ and the read data buffers $DB_{F11}$ to $DB_{Fmn}$ may not be physically divided.

It has been illustrated in FIG. 4 that the first index information $I_{H11}$ to $I_{Hmn}$ stored in the first index storage unit HR may correspond to the write data buffers $DB_{H11}$ to $DB_{Hmn}$ of the buffer memory 230, respectively, and the second index information $I_{F11}$ to $I_{Fmn}$ stored in the second index storage unit FR may be correspond to the read data buffers $DB_{F11}$ to $DB_{Fmn}$ of the buffer memory 230, respectively, for clarity. However, the present embodiment is not limited thereto. For example, the first and second index information $I_{H11}$ to $I_{Hmn}$ and $I_{F11}$ to $I_{Fmn}$ may not be one-to-one corresponding to the write and read data buffers $DB_{H11}$ to $DB_{Hmn}$ and $DB_{F11}$ to $DB_{Fmn}$, respectively.

Referring back to FIG. 3, the buffer release queue 245 of the volatile memory 240 may include a host buffer release queue HBRQ and an FTL buffer release queue FBRQ.

The host buffer release queue HBRQ may queue the operation done signal ODS transferred from the FTL CPU 250 and provide the queued operation done signal ODS to the host CPU 220. The FTL buffer release queue FBRQ may queue the operation done signal ODS transferred from the host CPU 220 and provide the queued operation done signal ODS to the FTL CPU 250. The host buffer release queue HBRQ and the FTL buffer release queue FBRQ may be configured of a ring queue, although the present embodiment is not limited thereto. A detailed structure and operation of the ring queue are known technology in the related art and thus detailed description thereof will be omitted.

In the embodiment, the operation done signal ODS may be status information notifying the nonvolatile memory device 100 (or the host device) that a transfer operation of write data (or read data), which is stored in the data buffer corresponding to the index information provided from the host CPU 220 (or FTL CPU 250), is done. For example, the transfer operation of the operation done signal ODS to the FTL buffer release queue FBRQ (or the host buffer release queue HBRQ) from the host CPU 220 (or the FTL CPU 250) may be referred to as a transfer operation of a signal for requesting allocation release of the data buffer allocated through the FTL CPU 250 (or the host CPU 220).

The allocation operation and the allocation release operation of the data buffer of the buffer memory 230 in the host CPU 220 and the FTL CPU 250 when the write request and the read request from a host device are processed will be described below in more detail with reference to FIGS. 5 and 6, respectively.

Referring back to FIG. 2, the FTL CPU 250 may perform overall operations related to interfacing with the nonvolatile memory device 100. For example, the FTL CPU 250 may generate a command CMD (for example, a write command and a read command) based on the requests RQ (for example, the write request and the read request) provided from the host CPU 220, and provide the generated command CMD to the nonvolatile memory device 100. The FTL CPU 250 may translate a logical block address (LBA) provided from the host CPU 220 to a physical block address (PBA) corresponding thereto and provide the translated PBA to the nonvolatile memory device 100.

The data buffer of the buffer memory 230 may be allocated to the FTL CPU 250 and the FTL CPU 250 may temporarily store data DATA read from the nonvolatile memory device 100 in the allocated data buffer. When the corresponding data DATA is transferred to a host device through the host CPU 220, the FTL CPU 250 may release the allocation of data buffer. The FTL CPU 250 may transfer the write data, which is temporarily stored in the data buffer corresponding to the index information provided from the host CPU 220, to the nonvolatile memory device 100.

The memory interface 260 may provide physical connection between the controller 200 and the nonvolatile memory 100. For example, a command, an address, data, and the like may be exchanged between the controller 200 and the nonvolatile memory device 100 through the memory interface 260.

Figure 5:
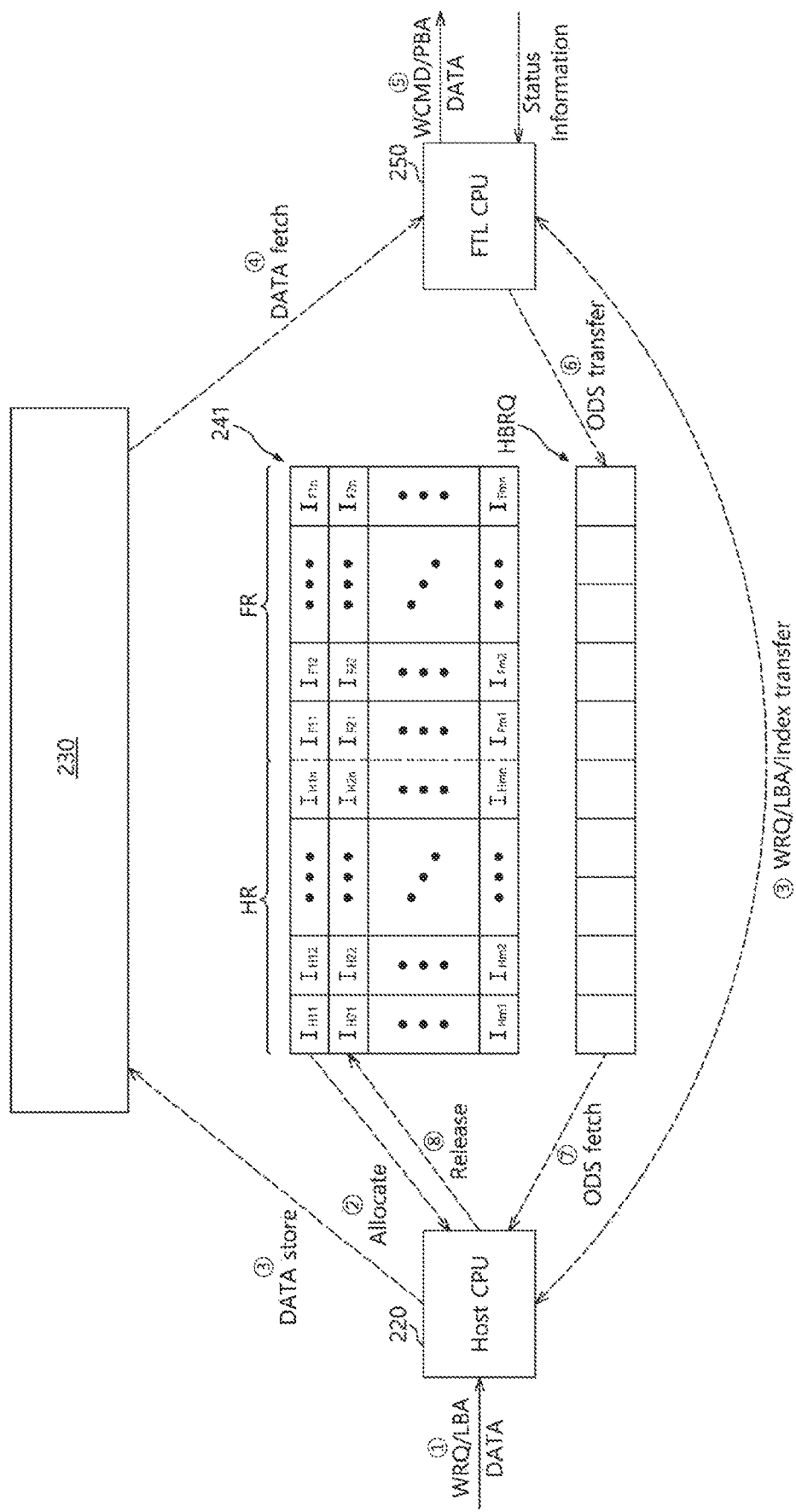
FIG. 5 is a diagram illustrating a process of allocating a buffer and releasing the allocation of the buffer in a write operation by a controller according to an embodiment of the present disclosure.

FIG. 5 is a diagram illustrating a process of allocating a buffer and releasing the allocation of the buffer in a write operation according to an embodiment.

Referring to FIG. 5, when a write request WRQ, a logical block address (LBA) to be written, and write data DATA to be written are received from a host device ((①)), the host CPU 220 may allocate a first index $I_H$ by accessing the first index storage unit HR of the volatile memory 240 ((②)). For example, the host CPU 220 may perform an allocation of the first index $I_H$ using a pop code. Next, the host CPU 220 may temporarily store the write data DATA in a first data buffer $DB_H$ corresponding to the allocated first index $I_H$ ((③)) and simultaneously transfer the write request WRQ, the logical block address (LBA) to be written, and the first index $I_H$ to the FTL CPU 250 ((③)).

The FTL CPU 250 may generate a write command WCMD to be provided to the nonvolatile memory device 100 based on the write request WRQ, translate the logical block address (LBA) to be written to a physical block address (PBA) corresponding thereto, and fetch the write data DATA from the first data buffer $DB_H$ corresponding to the first index $I_H$ ((④)). Next, the FTL CPU 250 may provide the write command WCMD, the physical block address (PBA), and the write data DATA to the nonvolatile memory device 100 ((⑤)).

When the status information indicating that the write operation is done is received from the nonvolatile memory device 100, the FTL CPU 250 may transfer the operation done signal ODS to the host buffer release queue HBRQ of the volatile memory 240 ((⑥)).

When the operation done signal ODS is provided from the host buffer release queue HBRQ ((⑦)), the host CPU 220 may perform allocation release of the first index $I_H$ previously allocated ((⑧)). For example, the host CPU 220 may perform the allocation release of the first index $I_H$ using a push code.

Figure 6:
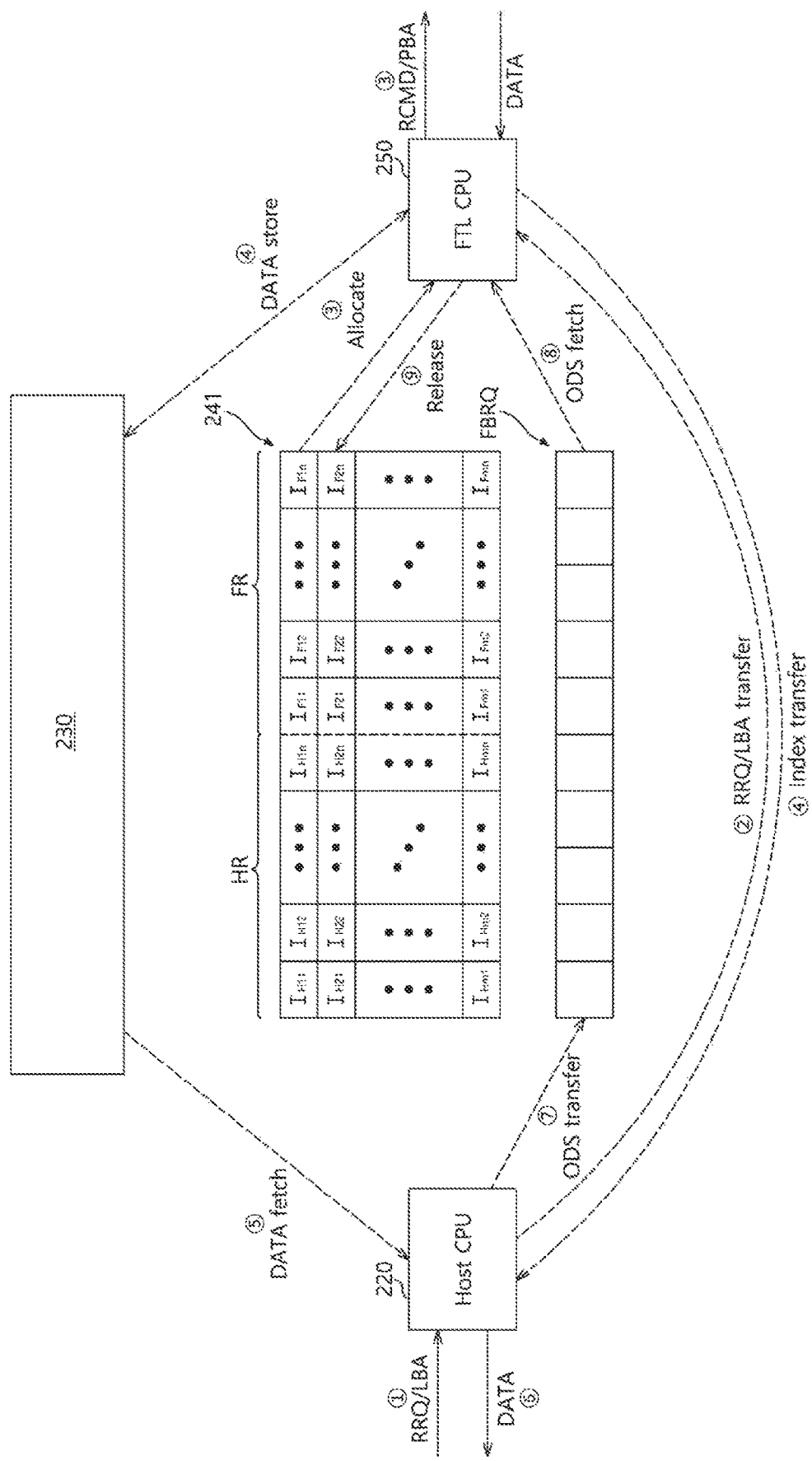
FIG. 6 is a diagram illustrating a process of allocating a buffer and releasing the allocation of the buffer in a read operation by a controller according to an embodiment of the present disclosure.

FIG. 6 is a diagram illustrating a process of allocating a buffer and releasing the allocation of the buffer in a read operation according to an embodiment.

Referring to FIG. 6, when a read request RRQ and a logical block address (LBA) to be read are received from a host device ((①)), the host CPU 220 may transfer the read request RRQ and the logical block address (LBA) to be read received from the host device to the FTL CPU 250 ((②)).

The FTL CPU 250 may generate a read command RCMD to be provided to the nonvolatile memory device 100 based on the read request RRQ, translate the logical block address (LBA) to be read to a physical block address (PBA) corresponding thereto, and provide the read command RCMD and the physical block address (PBA) to be read to the nonvolatile memory device 100 ((③)). Simultaneously, the FTL CPU 250 may allocate a second index $I_F$ by accessing the second index storage unit FR of the volatile memory 240 ((③)). For example, the FTL CPU 250 may perform an allocation of the second index $I_F$ using a pop code.

Next, the FTL CPU 250 may receive read data DATA from the nonvolatile memory device 100, temporarily store the read data DATA to a second data buffer $DB_F$ corresponding to the allocated second index $I_F$ ((④)), and simultaneously the FTL CPU 250 may transfer the second index $I_F$ to the host CPU ((④)).

The host CPU 220 may fetch the read data DATA from the second data buffer $DB_F$ corresponding to the second index $I_F$ ((⑤)) and transfer the read data DATA to the host device ((⑥)). Next, the host CPU 220 may transfer the operation done signal ODS to the FTL buffer release queue FBRQ of the volatile memory 240 ((⑦)).

When the operation done signal ODS is provided from the FTL buffer release queue FBRQ ((⑧)), the FTL CPU 250 may perform allocation release of the second index $I_F$ previously allocated ((⑨)). For example, the FTL CPU 250 may perform the allocation release of the second index $I_F$ using a push code.

As described above, the host CPU 220 and the FTL CPU 250 include the dedicated buffer regions and the dedicated buffer release queues in the embodiment. Thus the host CPU 220 and the FTL CPU 250 may simultaneously perform the allocation and the allocation release of the dedicated buffer regions thereof, improving the processing speed for the request transferred from a host device.

Figure 7:
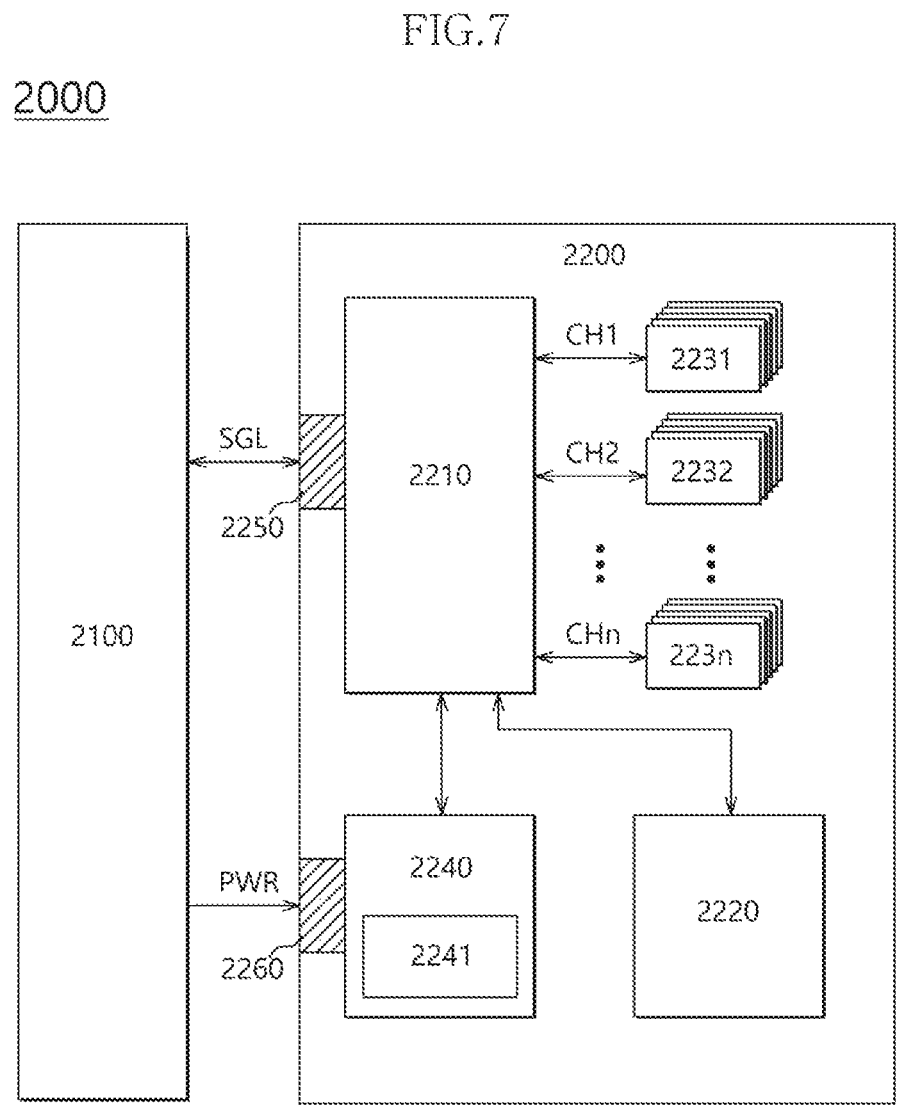
FIG. 7 is a diagram illustrating an example of a data processing system including a solid state drive (SSD) according to an embodiment of the present disclosure.

FIG. 7 is a diagram illustrating an example of a data processing system 2000 including a solid state drive (SSD) 2200 according to an embodiment. Referring to FIG. 7, the data processing system 2000 may include a host device 2100 and the SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. Further, the buffer memory device 2220 may temporarily store data read from the nonvolatile memory devices 2231 to 223n. The data temporarily stored in the buffer memory device 2220 may be transmitted to the host device 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled with the controller 2210 through a plurality of channels CH1 to CHn, respectively. One or more nonvolatile memory devices may be coupled to one channel. The nonvolatile memory devices coupled to the one channel may be coupled to the same signal bus and the same data bus.

The power supply 2240 may provide power PWR inputted through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include at least one capacitor with large capacity capable of charging the power PWR.

The controller 2210 may exchange a signal SGL with the host device 2100 through the signal connector 2250. The signal SGL may include a command, an address, data, and the like. The signal connector 2250 may be configured of various types of connectors according to an interfacing method between the host device 2100 and the SSD 2200.

Figure 8:
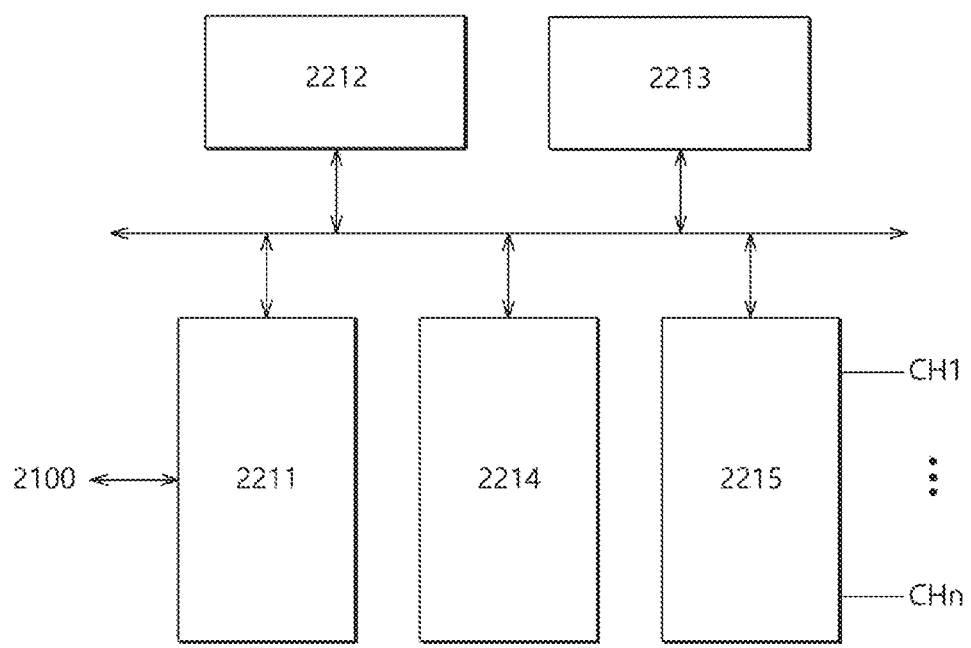
FIG. 8 is a diagram illustrating an example of a controller illustrated in FIG. 7.

FIG. 8 is a diagram illustrating an example of the controller 2210 of FIG. 7. Referring to FIG. 8, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host device 2100 and the SSD 2200 according to a protocol of the host device 2100. For example, the host interface unit 2211 may communicate with the host device 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-e) protocol, and a universal flash storage (UFS) protocol. The host interface unit 2211 may perform a disc emulation function that the host device 2100 recognizes the SSD 2200 as a general-purpose data storage device, for example, a hard disc drive HDD.

The control unit 2212 may analyze and process the signal SGL inputted from the host device 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide control signals such as commands and addresses to the nonvolatile memory devices 2231 to 223n according to control of the control unit 2212. Moreover, the memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 9:
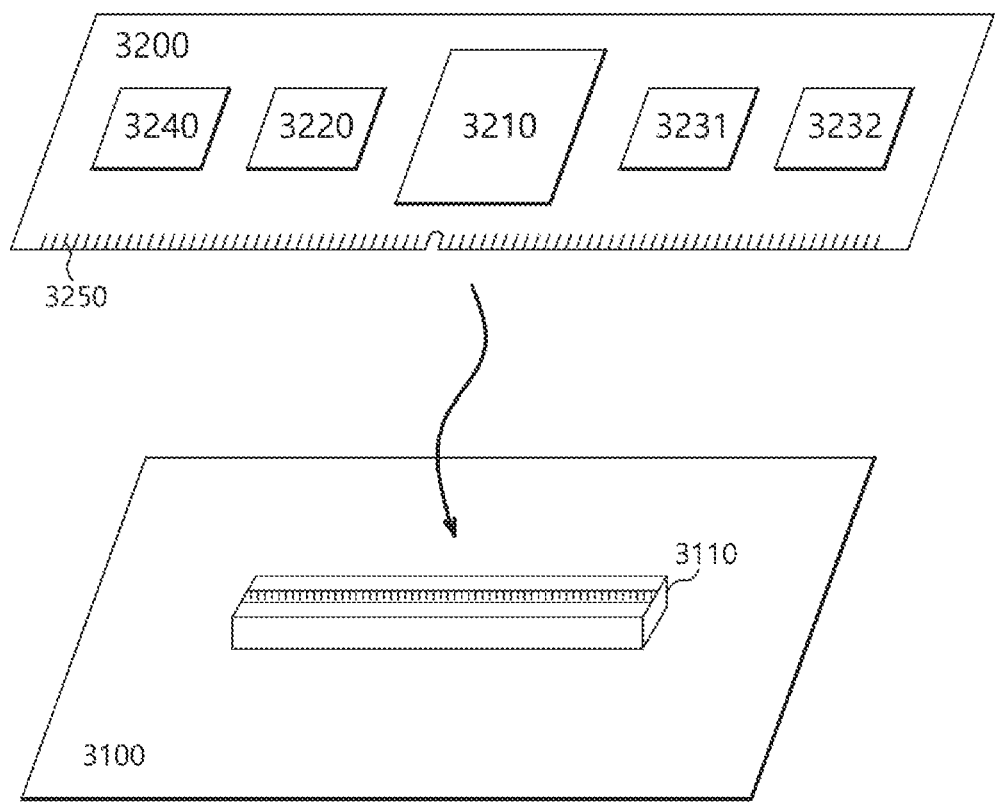
FIG. 9 is a diagram illustrating an example of a data processing system including a data storage device according to an embodiment of the present disclosure.

FIG. 9 is a diagram illustrating an example of a data processing system 3000 including a data storage device 3200 according to an embodiment. Referring to FIG. 9, the data processing system 3000 may include a host device 3100 and a data storage device 3200.

The host device 3100 may be configured in a board form such as a printed circuit board (PCB). Although not shown in FIG. 9, the host device 3100 may include internal functional blocks configured to perform functions of the host device 3100.

The host device 3100 may include a connection terminal 3110 such as a socket, a slot, or a connector. The data storage device 3200 may be mounted on the connection terminal 3110.

The data storage apparatus 3200 may be configured in a board form such as a printed circuit board (PCB). The data storage device 3200 may refer to a memory module or a memory card. The data storage device 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage device 3200. The controller 3210 may be configured to have the same configuration as the controller 2210 illustrated in FIG. 8.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power inputted through the connection terminal 3250 to the inside of the data storage device 3200. The PMIC 3240 may manage the power of the data storage device 3200 according to control of the controller 3210.

The connection terminal 3250 may be coupled to the connection terminal 3110 of the host device 3100. Signals such as commands, addresses, and data and power may be transmitted between the host device 3100 and the data storage device 3200 through the connection terminal 3250. The connection terminal 3250 may be configured in various forms according to an interfacing method between the host device 3100 and the data storage device 3200. The connection terminal 3250 may be arranged in any one side of the data storage device 3200.

Figure 10:
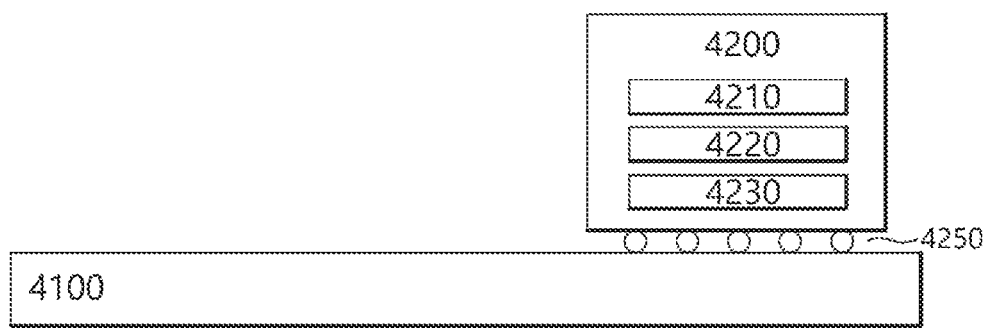
FIG. 10 is a diagram illustrating an example of a data processing system including a data storage device according to an embodiment of the present disclosure.

FIG. 10 is a diagram illustrating an example of a data processing system 4000 including a data storage 4200 according to an embodiment. Referring to FIG. 10, the data processing system 4000 may include a host device 4100 and the data storage device 4200.

The host device 4100 may be configured in a board form such as a printed circuit board (PCB). Although not shown in FIG. 10, the host device 4100 may include internal functional blocks configured to perform functions of the host device 4100.

The data storage device 4200 may be configured in a surface mounting packaging form. The data storage device 4200 may be mounted on the host device 4100 through solder balls 4250. The data storage device 4200 may include a controller 4210, a buffer memory device 4220, and a nonvolatile memory device 4230.

The controller 4210 may control an overall operation of the data storage device 4200. The controller 4210 may be configured to have the same configuration as the controller 2210 illustrated in FIG. 8.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 through control of the controller 4210.

The nonvolatile memory device 4230 may be used as a storage medium of the data storage device 4200.

Figure 11:
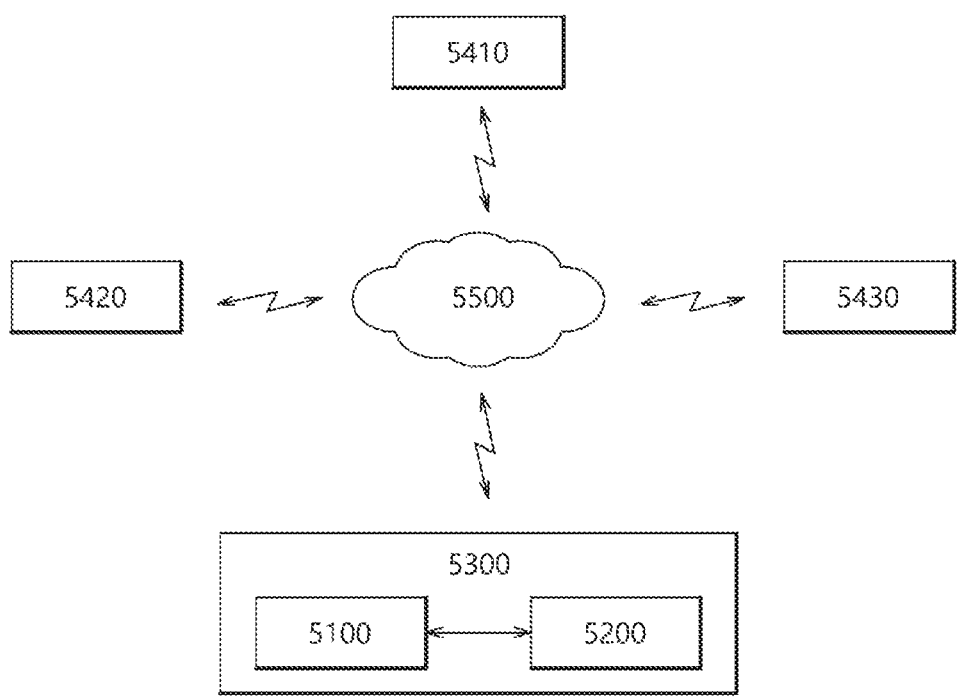
FIG. 11 is a diagram illustrating an example of a network system including a data storage device according to an embodiment of the present disclosure.

FIG. 11 is a diagram illustrating an example of a network system 5000 including a data storage device 5200 according to an embodiment. Referring to FIG. 11, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host device 5100 and a data storage device 5200. The data storage device 5200 may be configured in the same manner as the data storage device 10 of FIG. 1, the data storage device 2200 of FIG. 7, the data storage device 3200 of FIG. 9, or the data storage device 4200 of FIG. 10.

Figure 12:
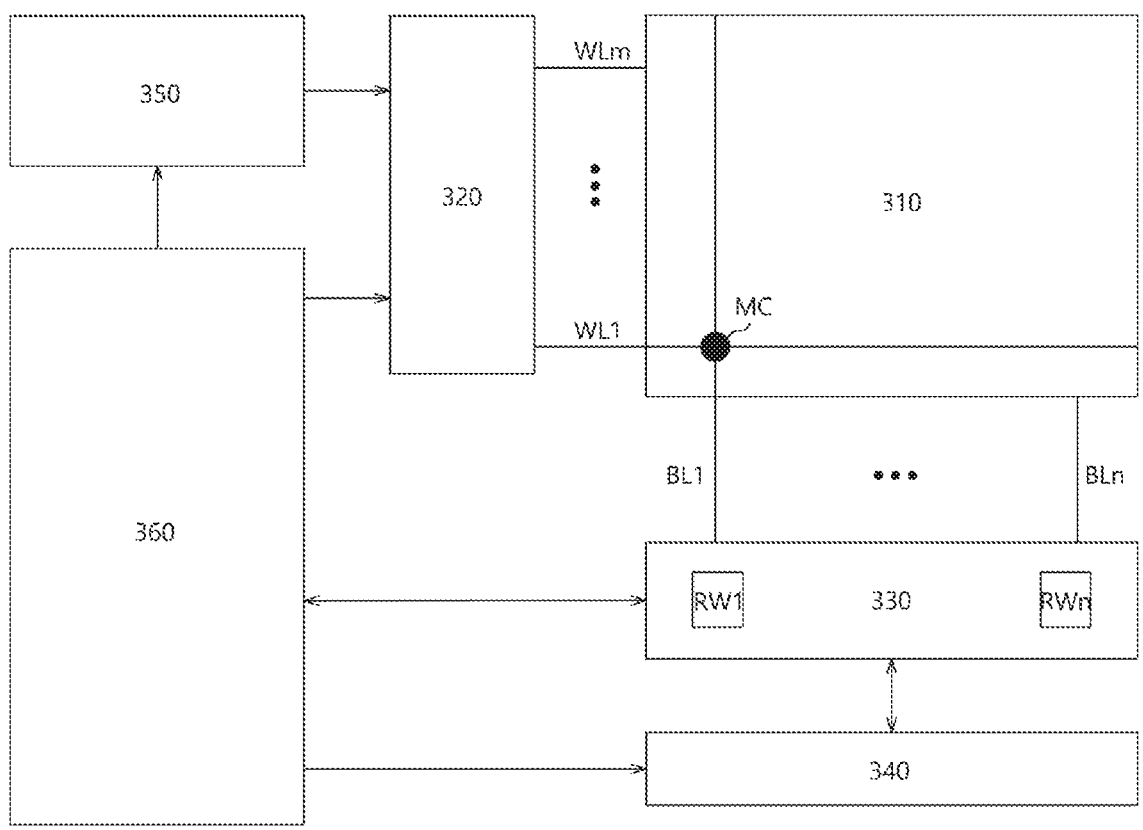
FIG. 12 is a block diagram illustrating an example of a nonvolatile memory device included in a data storage device according to an embodiment of the present disclosure.

FIG. 12 is a block diagram illustrating an example of a nonvolatile memory device 300 included in a data storage device according to an embodiment. Referring to FIG. 12, the nonvolatile memory device 300 may include a memory cell array 310, a row decoder 320, a column decoder 340, a data read/write block 330, a voltage generator 350, and a control logic 360.

The memory cell array 310 may include memory cells MC arranged in regions in which word lines WL1 to WLm and bit lines BL1 to BLn cross to each other.

The row decoder 320 may be coupled to the memory cell array 310 through the word lines WL1 to WLm. The row decoder 320 may operate through control of the control logic 360. The row decoder 320 may decode an address provided from an external apparatus (not shown). The row decoder 320 may select and drive the word lines WL1 to WLm based on a decoding result. For example, the row decoder 320 may provide a word line voltage provided from the voltage generator 350 to the word lines WL1 to WLm.

The data read/write block 330 may be coupled to the memory cell array 310 through the bit lines BL1 to BLn. The data read/write block 330 may include read/write circuits RW1 to RWn corresponding to the respective bit lines BL1 to BLn. The data read/write block 330 may operate according to control of the control logic 360. The data read/write block 330 may operate as a write driver or a sense amplifier according to an operation mode. For example, the data read/write block 330 may operate as the write driver configured to store data provided from an external apparatus in the memory cell array 310 in a write operation. In another example, the data read/write block 330 may operate as the sense amplifier configured to read data from the memory cell array 310 in a read operation.

The column decoder 340 may operate though control of the control logic 360. The column decoder 340 may decode an address provided from an external apparatus (not shown). The column decoder 340 may couple the read/write circuits RW1 to RWn of the data read/write block 330 corresponding to the bit lines BL1 to BLn and data input/output (I/O) lines (or data I/O buffers) based on a decoding result.

The voltage generator 350 may generate voltages used for an internal operation of the nonvolatile memory device 300. The voltages generated through the voltage generator 350 may be applied to the memory cells of the memory cell array 310. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 360 may control an overall operation of the nonvolatile memory device 300 based on a control signal provided from an external apparatus. For example, the control logic 160 may control an operation of the nonvolatile memory device 300 such as a read operation, a write operation, an erase operation of the nonvolatile memory device 300.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A data storage device comprising:
a nonvolatile memory device; and
a controller configured to control an operation of the nonvolatile memory device,
wherein the controller includes:
a volatile memory including a first index storage unit in which first index information for first data buffers are stored and a second index storage unit in which second index information for second data buffers are stored;
a first central processing unit (CPU) configured to perform allocation and release of allocation of the first data buffers by accessing the first index storage unit of the volatile memory; and
a second CPU configured to perform allocation and release of allocation of the second data buffers by accessing the second index storage unit of the volatile memory,
wherein the first CPU performs the release of allocation of the first data buffers according to a signal provided from the second CPU, and
wherein the second CPU performs the release of allocation of the second data buffers according to a signal provided from the first CPU.

2. The data storage device of claim 1, wherein the first CPU includes a host CPU configured to process overall operations related to interfacing with a host device and the second CPU is a flash translation layer (FTL) CPU configured to process overall operations related to interfacing with the nonvolatile memory device.

3. The data storage device of claim 1, wherein the volatile memory includes:
a first buffer release queue queuing a first operation done signal provided from the second CPU and providing the queued first operation done signal to the first CPU; and
a second buffer release queue queuing a second operation done signal provided from the first CPU and providing the queued second operation done signal to the second CPU.

4. The data storage device of claim 3, wherein the first operation done signal includes a signal indicating that an operation of storing write data in the nonvolatile memory device in response to a write request from a host device is done, and
the second operation done signal includes a signal indicating that an operation of transferring read data read from the nonvolatile memory device to the host device in response to a read request from the host device is done.

5. The data storage device of claim 4, wherein when the write request and the write data are received from the host device, the first CPU allocates at least one first data buffer among the first data buffers by accessing the first index storage unit of the volatile memory, stores the write data in the allocated first data buffer, and provides the first index information corresponding to the allocated first data buffer to the second CPU.

6. The data storage device of claim 5, wherein the second CPU provides the write data stored in the first data buffer corresponding to the first index information provided from the first CPU to the nonvolatile memory device and transfers the first operation done signal to the first buffer release queue when the write data is stored in the nonvolatile memory device.

7. The data storage device of claim 6, wherein when the first operation done signal is provided from the first buffer release queue, the first CPU performs release of the allocation of the first data buffer.

8. The data storage device of claim 4, wherein when the read request is received from the host device, the second CPU receives the read data read from the nonvolatile memory device in response to the read request, allocates at least one second data buffer among the second data buffers by accessing the second index storage unit of the volatile memory, stores the read data in the allocated second data buffer, and provides the second index information corresponding to the allocated second data buffer to the first CPU.

9. The data storage device of claim 8, wherein the first CPU transfers the read data stored in the second data buffer corresponding to the second index information provided from the second CPU to the host device and transfers the second operation done signal to the second buffer release queue.

10. The data storage device of claim 9, wherein when the second operation done signal is provided from the second buffer release queue, the second CPU performs release of the allocation of the second data buffer.

11. The data storage device of claim 1, wherein the controller further includes a buffer memory including the first data buffers and the second data buffers.

12. The data storage device of claim 11, wherein the first data buffers temporarily store write data transferred to the nonvolatile memory device from a host device and the second data buffers temporarily store read data read from the nonvolatile memory device and transferred to the host device.

13. A method for operating a data storage device including a nonvolatile memory device and a controller, the controller including a volatile memory including a first index storage unit and a second index storage unit, a first central processing unit (CPU), and a second CPU, comprising:
receiving, by the first CPU, a write request and write data from a host device;
allocating, by the first CPU, at least one first data buffer among first data buffers by accessing the first index storage unit of the volatile memory;
storing, by the first CPU, the write data in the allocated first data buffer;
providing, by the first CPU, the first index information corresponding to the allocated first data buffer to the second CPU; and
releasing, by the first CPU, the allocated first data buffer according to a signal provided from the second CPU.

14. The method of claim 13, further comprising:
receiving, by the second CPU, a read request from the host device;
receiving, by the second CPU, read data read from the nonvolatile memory device in response to the read request;
allocating, by the second CPU, at least one second data buffer among second data buffers by accessing the second index storage unit of the volatile memory;
storing, by the second CPU, the read data in the allocated second data buffer; and
providing, by the second CPU, the second index information corresponding to the allocated second data buffer to the first CPU.

15. The method of claim 14,
wherein the first CPU includes a host CPU configured to process overall operations related to interfacing with the host device, and the second CPU includes a flash translation layer (FTL) CPU configured to process overall operations related to interfacing with the nonvolatile memory device, and wherein the volatile memory includes:

a first buffer release queue queuing a first operation done signal provided from the second CPU and providing the queued first operation done signal to the first CPU; and a second buffer release queue queuing a second operation done signal provided from the first CPU and providing the queued second operation done signal to the second CPU.

16. The method of claim 15, wherein the first operation done signal includes a signal indicating that an operation of storing the write data in the nonvolatile memory device in response to the write request from the host device is done, and wherein the second operation done signal includes a signal indicating that an operation of transferring read data read from the nonvolatile memory device to the host device in response to a read request from the host device is done.

17. The method of claim 16, further comprising:

providing, by the second CPU, the write data stored in the first data buffer corresponding to the first index information provided from the first CPU to the nonvolatile memory device; and transferring, by the second CPU, the first operation done signal to the first buffer release queue when the write data is stored in the nonvolatile memory device.

18. The method of claim 17, wherein the releasing of the allocated first data buffer is performed when the first operation done signal is provided from the first buffer release queue.

19. The method of claim 16, further comprising:

transferring, by the first CPU, the read data stored in the second data buffer corresponding to the second index information provided from the second CPU to the host device; and transferring, by the first CPU, the second operation done signal to the second buffer release queue.

20. The method of claim 19, further comprising:

performing, by the second CPU, release of the allocation of the second data buffer when the second operation done signal is provided from the second buffer release queue.

* * * * *